US012607972B2

(12) United States Patent
Schmidt et al.

(10) Patent No.: US 12,607,972 B2
(45) Date of Patent: Apr. 21, 2026

(54) METHOD AND APPARATUS FOR MONITORING MACHINE LEARNING MODELS

(71) Applicant: ABB Schweiz AG, Baden (CH)

(72) Inventors: Benedikt Schmidt, Heidelberg (DE); Ido Amihai, Heppenheim (DE); Moncef Chioua, Montreal (CA); Arzam Kotriwala, Ladenburg (DE); Martin Hollender, Dossenheim (DE); Dennis Janka, Heidelberg (DE); Felix Lenders, Darmstadt (DE); Jan Christoph Schlake, Darmstadt (DE); Benjamin Kloepper, Mannheim (DE); Hadil Abukwaik, Weinheim (DE)

(73) Assignee: ABB Schweiz AG, Baden (CH)

( * ) Notice: Subject to any disclaimer, the term of this patent is extended or adjusted under 35 U.S.C. 154(b) by 801 days.

(21) Appl. No.: 17/954,485

(22) Filed: Sep. 28, 2022

(65) Prior Publication Data

US 2023/0016668 A1      Jan. 19, 2023

Related U.S. Application Data

(63) Continuation of application No. PCT/EP2021/056180, filed on Mar. 11, 2021, which
(Continued)

(51) Int. Cl.
*G05B 13/02* (2006.01)
*G06N 3/082* (2023.01)

(52) U.S. Cl.
CPC ........... *G05B 13/027* (2013.01); *G06N 3/082* (2013.01)

(58) Field of Classification Search
None
See application file for complete search history.

(56) References Cited

U.S. PATENT DOCUMENTS

| | | |
|---|---|---|
| 2014/0222737 A1 | 8/2014 | Chen et al. |
| 2019/0286541 A1 | 9/2019 | Sobala et al. |
| 2021/0142456 A1* | 5/2021 | Varga ........................ G06T 1/20 |

FOREIGN PATENT DOCUMENTS

| | | |
|---|---|---|
| CN | 101533273 A | 9/2009 |
| CN | 106997476 A | 8/2017 |
| | (Continued) | |

OTHER PUBLICATIONS

Kruithof, Maarten C., et al. "Object recognition using deep convolutional neural networks with complete transfer and partial frozen layers." Optics and Photonics for Counterterrorism, Crime Fighting, and Defence XII. vol. 9995. SPIE, 2016. (Year: 2016).*
(Continued)

*Primary Examiner* — Eric Nilsson
(74) *Attorney, Agent, or Firm* — Fitch Even Tabin & Flannery LLP

(57) ABSTRACT

A method includes training a first control model by utilizing a first set of input data as first input, resulting in a trained first control model; copying the trained first control model to a second control model, wherein, after copying, the second input layer and the plurality of second hidden layers is identical to the plurality of first hidden layers, and the first output layer is replaced by the second output layer; freezing the plurality of second hidden layers; training the second control model by utilizing the first set of input data as second input, resulting in a trained second control model; and running the trained second control model by utilizing a second set of input data as second input, wherein the second output outputs the quality measure of the first control model.

14 Claims, 5 Drawing Sheets

Related U.S. Application Data is a continuation of application No. PCT/EP2020/059143, filed on Mar. 31, 2020.

(56)                 References Cited

FOREIGN PATENT DOCUMENTS

| CN | 107121926 | | 9/2017 |
| CN | 107505837 | A | 12/2017 |
| CN | 110232434 | | 9/2019 |
| GB | 2535769 | A | 8/2016 |
| WO | WO 2020/037055 | A1 | 2/2020 |

OTHER PUBLICATIONS

European Patent Office, International Search Report in International Patent Application No. PCT/EP2021/056180, 3 pp. (Jun. 7, 2021).
European Patent Office, Written Opinion in International Patent Application No. PCT/EP2021/056180, 7 pp. (Jun. 7, 2021).
The Patent Office of the People's Republic of China, Office Action in Chinese Patent Application No. 202180010404.7, 10 pp. (Sep. 25, 2024).

* cited by examiner

METHOD AND APPARATUS FOR MONITORING MACHINE LEARNING MODELS

CROSS-REFERENCE TO RELATED APPLICATIONS

This patent application claims priority to International Patent Application No. PCT/EP2021/056180, filed on Mar. 11, 2021, which claims priority to International Patent Application No. PCT/EP2020/059143, filed on Mar. 31, 2020, each of which is incorporated herein in its entirety by reference.

FIELD OF THE DISCLOSURE

The present disclosure relates to the field of monitoring or controlling an industrial process, particularly by utilizing an artificial neural net, ANN.

BACKGROUND OF THE INVENTION

A machine learning model, e.g. an artificial neural net (ANN), can be used in industrial processes, e.g. for performing monitoring and/or control tasks. However, at least some of the machine learning models may degrade over time, because the process, which produces the related data, may change over use time. In at least some applications, the degrading is difficult to measure.

BRIEF SUMMARY OF THE INVENTION

In a general aspect, the present disclosure describes a method that, at least partly, improves the shortcomings of the prior art and, specifically, addresses the undesired degradation of machine learning models over time.

In one embodiment, a method for determining a quality measure of a first control model for monitoring or controlling an industrial process, wherein the first control model is an artificial neural net, ANN, comprising a first input, a first input layer, a plurality of first hidden layers, a first output layer, and a first output, is described. The method comprises the steps of:

Training the first control model by utilizing a first set of input data as first input, resulting in a trained first control model.

Copying the trained first control model to a second control model, wherein the second control model comprises a second input, a second input layer, a plurality of second hidden layers, a second output layer, and a second output that is configured to output the quality measure of the first control model, wherein, after copying, the second input layer is identical to the first input layer, the plurality of second hidden layers is identical to the plurality of first hidden layers, and the first output layer is replaced by the second output layer.

Freezing at least parts of the plurality of second hidden layers.

Training the second control model by utilizing the first set of input data as second input, resulting in a trained second control model.

Running the trained second control model by utilizing a second set of input data as second input, wherein the second output outputs the quality measure of the first control model.

The first control model may be called "primary model." The industrial process may be any process that produces, manufactures, and/or changes any goods, for instance of chemical, mechanical, and/or electrical nature. The first control model may be used for controlling the industrial process, directly or indirectly, and/or for monitoring the industrial process, e.g. by delivering information about the process and/or its behaviour. The first control model may be or comprise an artificial neural net, possibly combined with a standard computer and/or other computing means, for short named as "ANN". Each one of the layers of the first control model may comprise a set of neurons, which are connected by weighted edges. The values produced by the first output layer may be outputted, via the first output, to the industrial process and/or to a display, an alarm device, or the like. The values that are outputted to the industrial process may contribute to control and/or steer the industrial process.

Before a productive use of the first control model, it is trained by utilizing a first set of input data as first input or applied to the first input. The first set of input data may comprise historical data of one or more known monitoring or controlling situation(s), i.e. both the inputs and the outputs (e.g. the desired actions or reactions) are known. The situation(s) may comprise situations that ran well or very well and/or situations that ran badly. Training means that the first control model is changed by the training, particularly its plurality of first hidden layers, its neurons, and/or the weights of its weighted edges may be changed. Training the first control model may comprise to consider a cost function and/or rewards, when the monitoring or controlling outputs are within a desired range. This may include some kind of prediction how the industrial process will behave in some near future, for instance in one second, one minute, one hour, one day, etc. The prediction time ranges may depend on the type and/or on other specifics of the industrial process.

Training the first control model results in a trained first control model, which is, then, ready for its function(s). It is noted that the productive use of the trained first control model may change the first control model, thus degrading the first control model over time.

Immediately following the (initial) training by utilizing the first set of input data, the trained first control model is copied to the second control model. The second control model may be called "proxy model". The second control model is "frozen" afterwards, i.e. at least some of the second hidden layers are kept unchanged. The second control—e.g. the second input layer and the plurality of second hidden layers—model is, then, quite similar or identical to the trained first control model, with the exception of its second output layer. The second output layer may be trained for outputting the quality measure of the first control model, i.e. for evaluating a current quality of the first control model. The cost function and/or rewards of the second control model may comprise quality-related values, and thus change the second output layer.

These quality-related values may consider the direct reaction of the industrial process, but also—additionally or as an alternative—a prediction of the industrial process in some near future (e.g. as defined above). This prediction may include long-term effects or reactions of the industrial process, some delay time (dead time) and/or other effects or reactions. In other words, the second output is configured to output the quality measure of the first control model. Thus, after copying, the first output layer is replaced by the second output layer. The trained second control model may then be fixed or "frozen.". This "freezing" may comprise fixing the weights between the neurons of different layers, so that the training process cannot adjust the fixed weights of the frozen layers. This "freezing" may comprise not to fix all of the hidden layers, but to keep some of the layers unfrozen.

During the productive use of the first control model, the first control model is trained further by utilizing a second set of input data. This training may comprise to make and/or to use predictions. The second set of input data may be "live data" from the industrial process. In parallel, the trained second control model is run—i.e. not trained and thus kept unchanged—by utilizing the second set of input data as second input. Since the second output of the trained second control model is configured to output the quality measure of the first control model, any degrading of the first control model—i.e. its quality and/or performance—can be measured this way. Once available, the measure of degrading may be used in various way, for instance for warning service personnel, for improving the industrial process and/or its controlling, and/or for running tailored applications.

BRIEF DESCRIPTION OF THE SEVERAL VIEWS OF THE DRAWING(S)

The subject matter of the disclosure will be explained in more detail in the following text with reference to preferred exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1A:
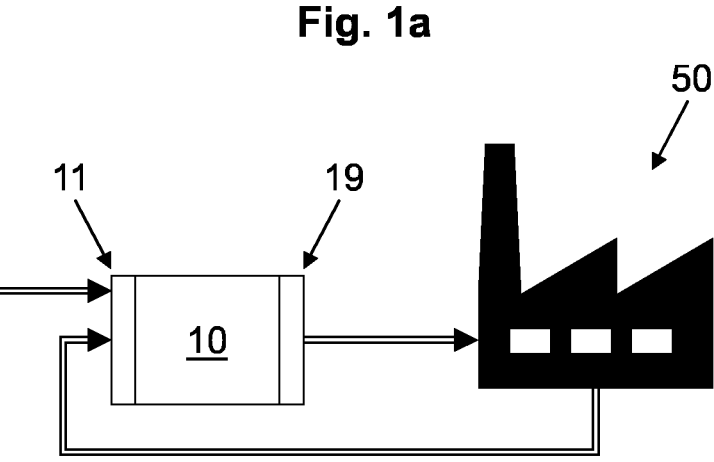
FIG. 1a is a schematic of a first control model according to an embodiment of the present disclosure.

FIG. 1a schematically shows a first control model 10 according to an embodiment. The first control model may also be called a "primary model." The first control model 10 has one or more inputs 11 and one or more outputs 19. The inputs 11 may come from user specifications, control specifications, and/or signals fed back from an industrial process 50. The outputs 19 may control or monitor the industrial process 50. For monitoring or controlling the industrial process 50, further means (not shown) may be helpful and/or necessary, e.g. networks, displays, databases, journals, and/or further means.

Figure 1B:
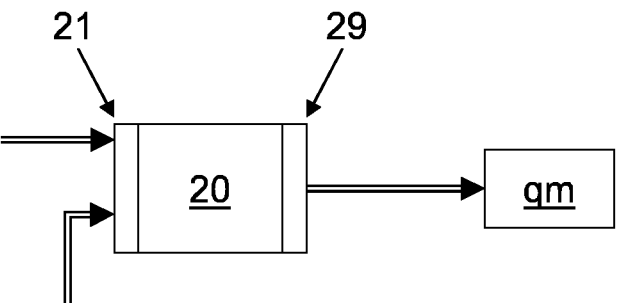
FIG. 1b is a schematic of a second control model according to an embodiment of the present disclosure.

FIG. 1b schematically shows a second control model 20 according to an embodiment. The second control model may be called a "proxy model". The second control model 20 may be run in parallel to the first control model 10 (see FIG. 1a), and/or may be run by feeding a defined data set to its input(s) 21. The output 29 may be configured to deliver a quality measure qm and/or further data. The quality measure qm may be an indicator of the quality or performance of the first control model 10 and/or of the industrial process 50.

Figure 2A:
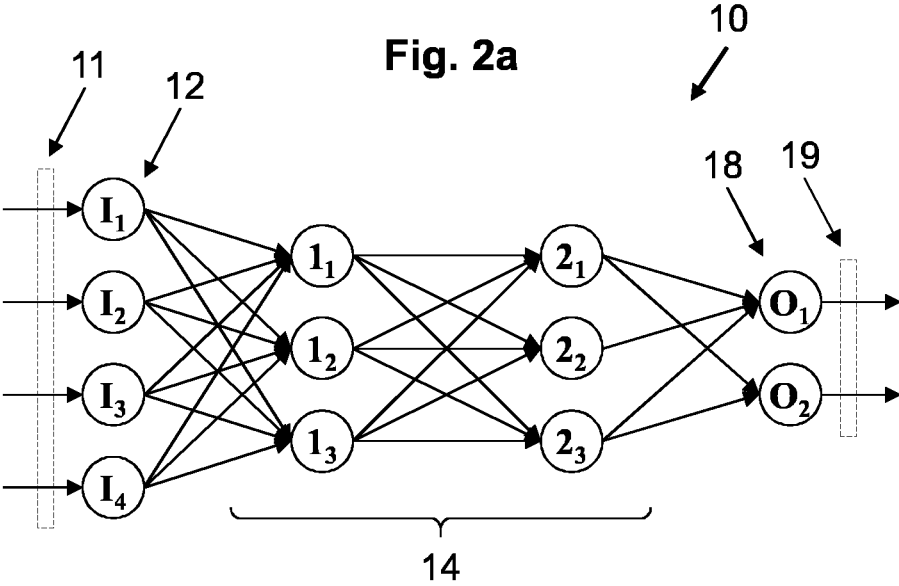
FIG. 2a is a schematic of a simplified schema of a first control model according to an embodiment of the present disclosure.

FIG. 2a schematically shows a simplified schema of a first control model 10 according to an embodiment. The first control model 10 comprises an input layer 12, hidden layers 14, and an output layer 18. Each layer of the hidden layers 14 comprises a set of neurons, depicted as set of nodes, which are connected by weighted edges. In numerous control models, the number of hidden layers may be freely configurable (possibly within predefined ranges), and the weights of the weighted edges may be changed by a training process, which influences at least the weights. Furthermore, the first control model 10 has inputs 11 and outputs 19.

Figure 2B:
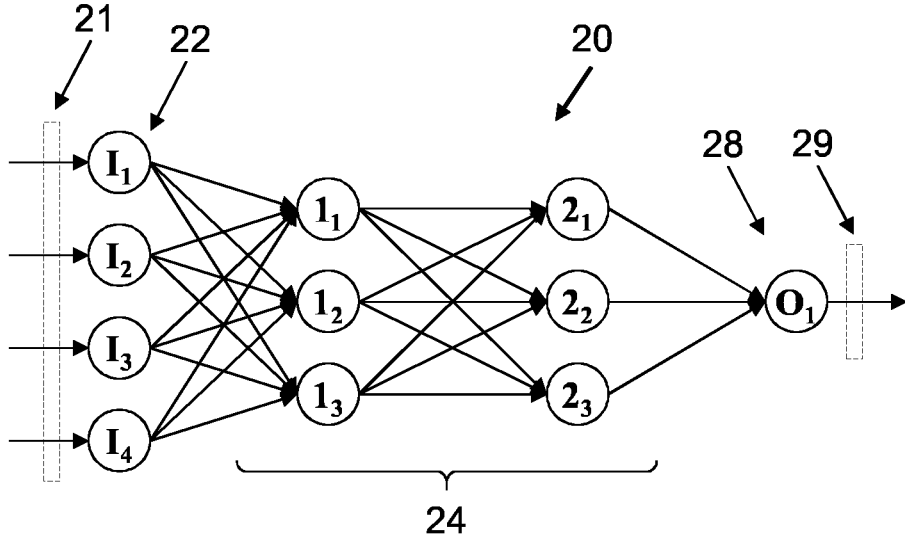
FIG. 2b is a schematic of a simplified schema of a second control model according to an embodiment of the present disclosure.

FIG. 2b schematically shows a simplified schema of a second control model 20 according to an embodiment. The second control model 20 comprises an input layer 22, hidden layers 24, and an output layer 28. Furthermore, the second control model 20 has inputs 21 and at least one output 29.

Using two control models 10, 20 allows not only to monitor and/or to control an industrial process, but also to get a measure for the quality of the industrial process and/or its controlling model. For this, both the first control model 10 and the second control model 20 is trained. FIG. 2a and FIG. 2b illustrate the relationship between the first control model or primary model 10 and the second control model or proxy model 20. Both models are identical regarding the inputs, the architecture—e.g. the number of hidden layers and nodes as well as the connection—and the weights between the input layers and first hidden layer and between the hidden layers. In this way, the performance of the two models 10, 20 is tightly connected. If features and relationships learned in the primary model are not valid anymore for the new data and subsequently the performance will degrade, the same will happen for the proxy model.

Figure 3:
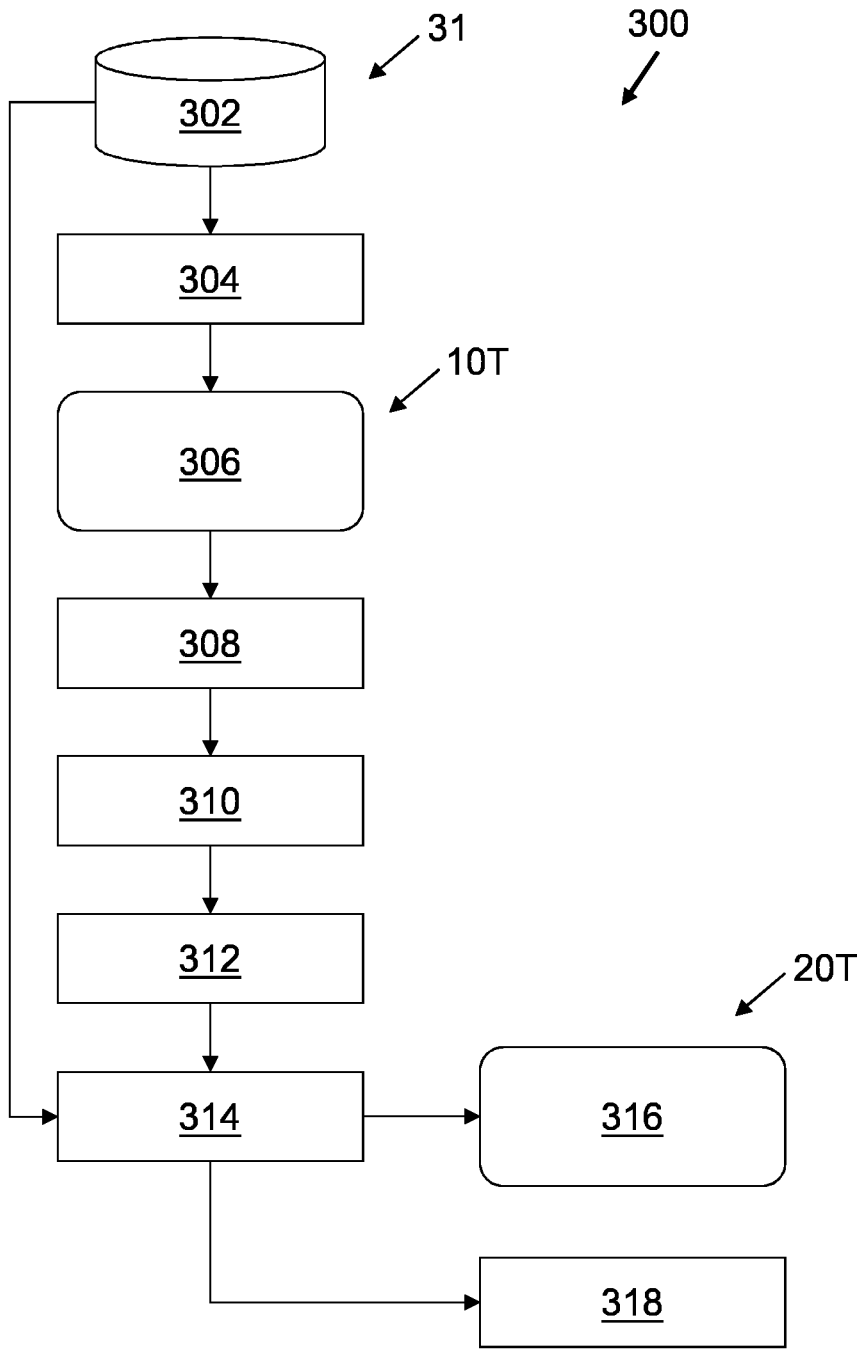
FIG. 3 is an exemplary dataflow according to an embodiment of the present disclosure.

FIG. 3 shows a dataflow 300 according to an embodiment, comprising a training process for the primary model 10 and the proxy model 20. First, the primary model 10 is trained. The primary model 10 is then copied and the output layer 28 is replaced. The output layer 28 may be chosen in a way that data itself can be used for labelling (self-learning or self-supervised learning). As an example, a compression-reconstruction task (e.g. AutoEncoder) or a regression task on the data (e.g. predict a future value) may be implanted. Then, all layers 22, 24, except the final layer 28 are frozen, i.e. the training process is no longer allowed to change weights between the input layer 22 and the hidden layer 24 and between the hidden layers 24. Then, the proxy model 20 is retrained for the new task. Finally, the performance of the proxy model 20 on the training data and a validation set is measured. The performance measure depends on the self-supervised learning task, e.g. reconstruction error for AutoEncoder, Mean-Squared Error for regression.

The dataflow 300 of FIG. 3 shows additional details of this process of the initial training sequence of the first control model 10 and second control model 20. In a step 302, a first data set 31 is provided. In a step 304, the first control model 10 is trained by utilizing a first set of input data 31 as first input 11. This results, in a step 306, in a trained first control model or trained primary model 10T. In a step 308, the trained first control model 10T is copied to a second control model 20. As a result, the second input layer 22 is identical to the first input layer 12 and the plurality of second hidden layers 24 is identical to the plurality of first hidden layers 14. In a step 310, the copied output layer 18 of first control model 10 is replaced by output layer 28 in the second control model 20. The values of the output layer 28 are outputted to the second output 29, which is configured to output the quality measure qm or Key-Performance-Indicator (KPI) of the first control model 10. The qm or KPI may include to consider some prediction of the behaviour of the industrial process 50, e.g. in some near future. In a step 312, the hidden layers 24 of the second control model 20 are frozen. In a step 314, the second control model 20 is trained with first data set 31. This results, in step 316, in a trained second control model or proxy model 20T. In a step 318, the quality measure 29 of the first control model 10 is provided by the trained second control model 20T, and it can be used for further steps.

Figure 4:
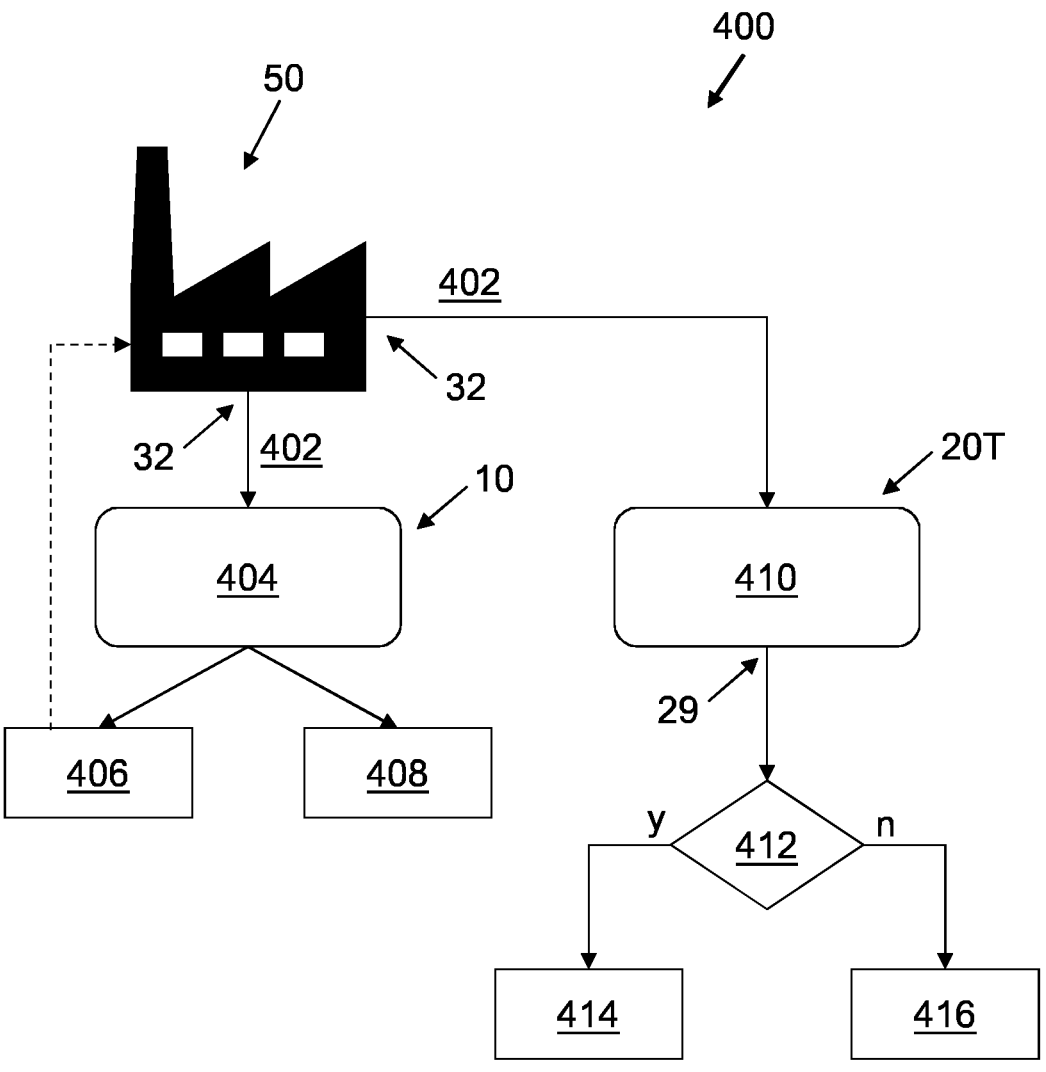
FIG. 4 is an exemplary further dataflow according to an embodiment of the present disclosure.

FIG. 4 shows a dataflow 400 according to an embodiment, comprising the application of the proxy model 20 during its productive use, e.g. for the industrial process 50. Both the primary model 10 and the proxy model 20 are feed with the same live data 32 from the industrial process and/or a database. The primary model 10 may be used to produce a prediction for the monitoring or control task, which may e.g. result in a display on a human machine interface or in triggering of actions. By utilizing the proxy model 20, the performance or quality spanning over a defined time window or number of predictions is calculated. If the performance is outside, e.g. below, a predefined threshold, the user or administrator may be notified and/or a retraining may be triggered.

The dataflow 400 of FIG. 4 shows some details of this process of applying the second data set—e.g. live data from the industrial process 50—to the control models 10, 20. In a step 402, the second data set 32 is provided. The second data set 32 may comprise live data from the industrial process 50. In a step 404, the second data set 32 is applied to the first control model 10, which may result in a further training of the first control model 10, and in changing the first control model 10. In a step 406, first outputs 19 of the first control model 10 are provided to the industrial process 50, e.g. for controlling it. In a step 408, first outputs 19 of the first control model 10 are provided to a database, a display, and/or to another a human-machine interface (HMI). Steps 406 and 408 may be run in parallel, or one of the steps (e.g. 406) may be prioritized.

In a step 410, the (unchanged) trained second control model 20T is run, and the quality measure qm is output at output 29. In a step 412, the quality measure qm is compared to a predefined measure or measure range, and is checked if the quality measure qm is outside, e.g. below, the predefined measure. If the quality measure qm is inside the predefined measure, in a step 414 predefined actions are performed; this may include to do nothing, or send a message. If the quality measure qm is outside (e.g. below) the predefined measure in a step 416 predefined actions are performed. The predefined actions may comprise the actions of dataflow 500 (see FIG. 5).

Figure 5:
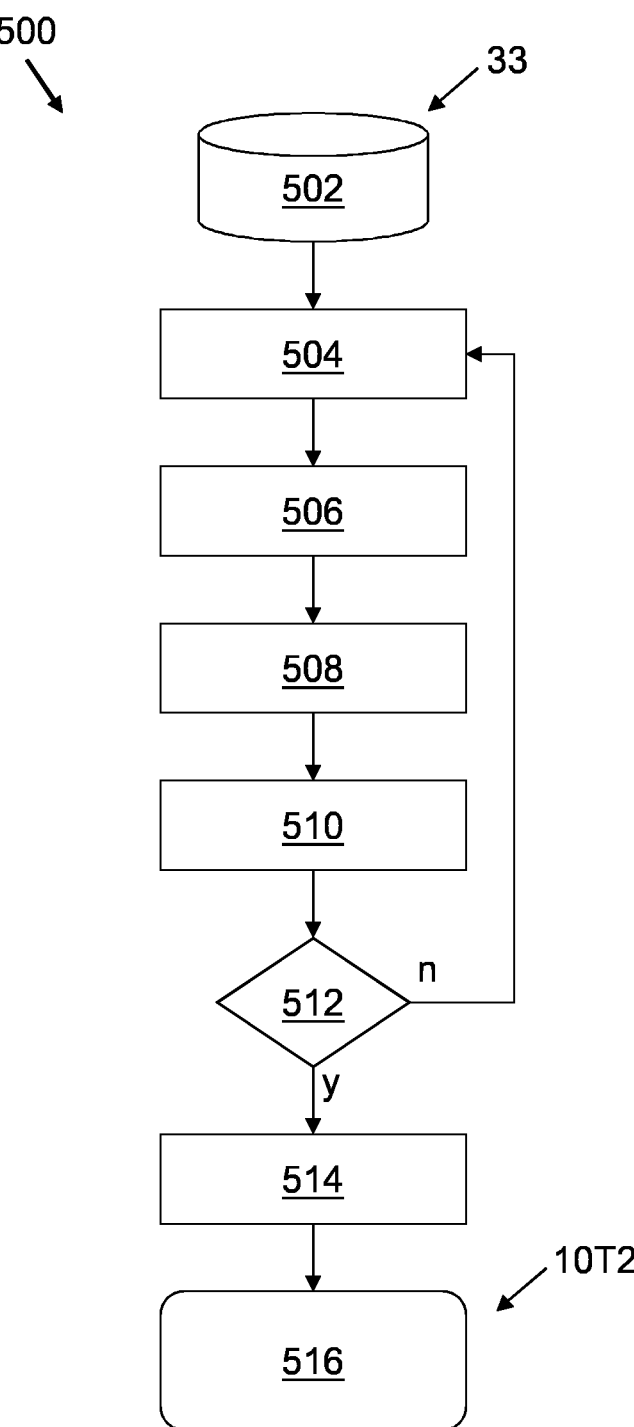
FIG. 5 is an exemplary further dataflow according to an embodiment of the present disclosure.

FIG. 5 shows a dataflow 500 according to an embodiment, which includes to show how the proxy model 20 is configured to find a time-window on the historical data that is suitable for retraining. This is based on the insight, that because of having changed the underlying data, not all historical data may be beneficial for retraining the models 10 and 20. Based on this idea, different time windows (or third data set 33) are sampled from the entire set of historical data, and are used as training data for the self-learning proxy model 20. Because the data itself is used for labelling, the performance of the models 10 and 20 may be measured, e.g. based on a test data set with recent data, which may represent a current behaviour of the industrial process 50. When the performance of the retrained proxy model 20 shows a sufficiently good quality measure qm, the primary model 10 is retrained on the same third data set 33 of this time-window. Due to the strong similarity of the two models and the fact the selected historical data enabled to train a proxy model 20 capable of capturing some recent behaviour, very likely the primary model 10 behaves well on this data set 33, too.

The dataflow 500 of FIG. 5 shows some details of this process of re-training the first control model 10. In a step 502, a third data set 33, a subset of historical data, is provided. In a step 504, hidden layers 24 of second control model 20 are unfrozen. In a step 506, the third data set 33 is applied to second control model 20, resulting in a re-training of the second control model 20. In a step 508, the quality measure qm is output. In a step 510, hidden layers 24 are frozen. In a step 512, quality measure qm is compared to a predefined measure (or measure range), and some checking if quality measure qm is within the predefined measure is conducted. If quality measure qm is not within the predefined measure, steps 504 to 510 are repeated, in many cases by selecting a different subset of historical data as the third data set 33.

When quality measure qm is within the predefined measure, in a step 514, the first control model 10 is re-trained, by taking the selected third data set 33 as input 11. This re-training results, in a step 516, in a corrected or updated trained first control model or corrected primary model 10T2.

In various embodiments, the last step—particularly running the trained second control model by utilizing a second set of input data—is repeated periodically and/or on request. The period of "periodically" may depend on the industrial process to be monitored or controlled. For some industrial processes, the repeating may be performed every month, week, day, hour, minute, second, and/or less or more frequently. Additionally or as an alternative, a user and/or a machine may request repeating said last step. The repeating may advantageously contribute to a high-quality supervision of the industrial process, and/or to do this in a timely manner.

In various embodiments, the method further comprises the steps of:

comparing the quality measure to a predefined measure; and when or if the quality measure is outside the predefined measure, performing a predefined action.

The predefined measure may be a measure range and/or may comprise a sequence of predefined measure for comparing with a sequence of quality measures. Being outside the predefined measure may mean to be below or even above the predefined measure. The predefined action may be one action or a plurality and/or a sequence of actions. When the quality measure is inside the predefined measure, another predefined action may be performed, e.g. to send a message, to enter a record in a journal, another action, or no action at all.

In various embodiments, the predefined action comprises at least one of: outputting an alarm, and/or re-training the first control model. Outputting an alarm may comprise to send a message of any kind to a user and/or to a machine and/or journal. Re-training the first control model may result in a corrected trained first control model, which may improve and/or otherwise change the industrial process and/or its quality.

Re-training the first control model comprises the steps of:

unfreezing the hidden layers of the trained second control model;

training the second control model by utilizing a third set of input data as second input, wherein the third set of input data is a set of historical data selected from a plurality of second sets of input data, wherein the second output outputs the quality measure;

freezing the hidden layers of the second control model;

comparing the quality measure to a predefined measure; and if or when the quality measure is inside the predefined measure, training the first control model by utilizing the third set of input data as first input, resulting in a corrected trained first control model.

Unfreezing the hidden layers of the trained second control model makes the second control model ready for training, i.e. for changes. The training is performed by using the third set of input data as second input. The third set of input data is a set or subset of historical data, which may have been used already as input data for the first input and/or for the second input. The historical data may comprise a plurality and/or a sequence of second sets of input data (or, at least, one second set of input data). The historical data may be generated by storing a sequence of live data from the industrial process. The third set of input data may be selected in an arbitrary way, or by using criteria such as: best performance of the industrial process, highest stability, and/or other criteria. The length of the third set of input data—for example the time-window taken from the historical data—may be similar to the length of the first set of input data, which has been used for the initial training.

The third set of input data, which has been selected as described, is then applied to the second input. As a result, the second output outputs the quality measure and the second control model is trained (and changed) by this third set of input data. Then, the hidden layers of the trained second control model are frozen.

Afterwards, the quality measure is compared to a predefined measure. In case the quality measure is inside the predefined measure, the trained second control model is kept frozen and the first control model by utilizing the third set of input data as first input. This re-training results in a corrected trained first control model. Advantageously, the corrected trained first control model makes use of the third set of input data, which is known to be beneficial for the industrial process, because this set of data already led to an improved process. Consequently, the first control model may not only be saved from degrading, but may be improved continuously.

In various embodiments, the method further comprises the steps of: if or when the quality measure is outside the predefined measure, repeating the steps of unfreezing, training, freezing, and comparing. This may advantageously contribute to a directed improving of the first control model and therefore to an improving of the industrial process.

In various embodiments, the training and/or re-training the first control model and/or the second control model comprises to make predictions and/or to use predictions. This may be possible, because historical data may be for the training and/or for the re-training, so that reactions of the industrial process are known, at least for the near future. To make predictions and/or to use predictions may advantageously contribute to a further improvement of monitoring or controlling the industrial process, or to further improve the industrial process itself, particularly because critical, long-term and/or unexpected reactions of the process may be considered by this.

An aspect relates to a computer program product comprising instructions, which, when the program is executed by a computer and/or an artificial neural net, ANN, cause the computer to and/or the ANN to carry out the method as described above and/or below.

An aspect relates to a computer-readable storage medium where a computer program or a computer program product as described above is stored on.

An aspect relates to a first control model and/or a second control model, configured for executing a method as described above and/or below.

An aspect relates to a use of a first control model for monitoring and/or controlling an industrial process.

LIST OF REFERENCE SYMBOLS

10 first control model (primary model)
10T trained first control model
10T2 corrected or updated trained first control model
11 inputs of first control model
12 input layer of first control model
14 hidden layers of first control model
18 output layer of first control model
19 outputs of first control model
20 second control model (proxy model)
20T trained second control model
11 inputs of second control model
22 input layer of second control model
24 hidden layers of second control model
28 output layer of second control model
29 outputs of second control model (KPI)
31 first data set
32 second data set (live data from the industrial process)
33 third data set (historical data)
300 dataflow
302-318 steps of dataflow 300
400 dataflow
402-416 steps of dataflow 400
500 dataflow
502-516 steps of dataflow 500

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for determining a quality measure of a first control model for monitoring or controlling an industrial process, wherein the first control model is an artificial neural net, ANN, comprising a first input, a first input layer, a plurality of first hidden layers, a first output layer, and a first output, the method comprising:

training the first control model by utilizing a first set of input data as first input, resulting in a trained first control model;

copying the trained first control model to a second control model, wherein the second control model comprises a second input, a second input layer, a plurality of second hidden layers, a second output layer, and a second output that is configured to output the quality measure of the first control model;

wherein, after copying, the second input layer is identical to the first input layer, the plurality of second hidden layers is identical to the plurality of first hidden layers, and the first output layer is replaced by the second output layer;

freezing at least parts of the plurality of second hidden layers;

training the second control model by utilizing the first set of input data as a second input, resulting in a trained second control model; and running the trained second control model by utilizing a second set of input data as the second input, wherein the second output outputs the quality measure of the first control model.

2. The method of claim 1, wherein running the second control model is repeated at least one of periodically and on request.

3. The method of claim 1, further comprising:

comparing the quality measure to a predefined measure; and when the quality measure is determined to be outside the predefined measure, performing a predefined action.

4. The method of claim 3, wherein the predefined action comprises at least one of outputting an alarm, and re-training the first control model.

5. The method of claim 4, wherein re-training the first control model comprises:

unfreezing the hidden layers of the trained second control model;

training the second control model by utilizing a third set of input data as the second input, wherein the third set of input data is a set of historical data selected from a plurality of second sets of input data, and wherein the second output outputs the quality measure;

freezing the hidden layers of the second control model;

comparing the quality measure to a predefined measure; and when the quality measure is determined to be inside the predefined measure, training the first control model by utilizing the third set of input data as the first input, resulting in a corrected trained first control model.

6. The method of claim 5, wherein when the quality measure is determined to be outside the predefined measure, the method further comprises repeating the steps of unfreezing, training, freezing, and comparing.

7. The method of claim 1, wherein training and/or re-training the first control model and/or the second control model comprises making and/or using predictions.

8. A non-transitory computer readable medium comprising a computer program product comprising computer executable instructions stored in a tangible medium that, when executed by a computer and/or an artificial neural net, ANN, cause the computer to and/or the ANN to determine a quality measure of a first control model for monitoring or controlling an industrial process, wherein the first control model comprises a first input, a first input layer, a plurality of first hidden layers, a first output layer, and a first output, the determining of the quality measure comprising:

training the first control model by utilizing a first set of input data as first input, resulting in a trained first control model;

copying the trained first control model to a second control model, wherein the second control model comprises a second input, a second input layer, a plurality of second hidden layers, a second output layer, and a second output that is configured to output the quality measure of the first control model;

wherein, after copying, the second input layer is identical to the first input layer, the plurality of second hidden layers is identical to the plurality of first hidden layers, and the first output layer is replaced by the second output layer;

freezing at least parts of the plurality of second hidden layers;

training the second control model by utilizing the first set of input data as a second input, resulting in a trained second control model; and running the trained second control model by utilizing a second set of input data as the second input, wherein the second output outputs the quality measure of the first control model.

9. The non-transitory computer readable medium of claim 8, wherein running the trained second control model is repeated at least one of periodically and on request.

10. The non-transitory computer readable medium of claim 8, further comprising:

comparing the quality measure to a predefined measure; and when the quality measure is determined to be outside the predefined measure, performing a predefined action.

11. The non-transitory computer readable medium of claim 10, wherein the predefined action comprises at least one of outputting an alarm, and re-training the first control model.

12. The non-transitory computer readable medium of claim 11, wherein re-training the first control model comprises:

unfreezing the hidden layers of the trained second control model;

training the second control model by utilizing a third set of input data as the second input, wherein the third set of input data is a set of historical data selected from a plurality of second sets of input data, and wherein the second output outputs the quality measure;

freezing the hidden layers of the second control model;

comparing the quality measure to a predefined measure; and when the quality measure is determined to be inside the predefined measure, training the first control model by utilizing the third set of input data as the first input, resulting in a corrected trained first control model.

13. The non-transitory computer readable medium of claim 12, wherein when the quality measure is determined to be outside the predefined measure, the method further comprises repeating the steps of unfreezing, training, freezing, and comparing.

14. The non-transitory computer readable medium of claim 8, wherein training and/or re-training the first control model and/or the second control model comprises making and/or using predictions.

\* \* \* \* \*